United States Patent [19]

Lindner et al.

[11] 4,297,446

[45] Oct. 27, 1981

[54] ABS-MOULDING COMPOSITIONS HAVING HIGH NOTCHED IMPACT STRENGTH

[75] Inventors: Christian Lindner, Cologne; Karl-Heinz Ott, Leverkusen; Bernhard Arnold, Pulheim; Friedrich Kowitz, Dormagen; Harald Oertel, Odenthal; Dieter Kuhlmann, Pulheim, all of Fed. Rep. of Germany

[73] Assignee: Bayer Aktiengesellschaft, Fed. Rep. of Germany

[21] Appl. No.: 69,597

[22] Filed: Aug. 24, 1979

[30] Foreign Application Priority Data

Aug. 29, 1978 [DE] Fed. Rep. of Germany ....... 2837597

[51] Int. Cl.$^3$ .................. C08L 51/04; C08L 51/00
[52] U.S. Cl. ..................................... 525/66; 525/83; 525/86; 525/102; 525/105
[58] Field of Search .................. 525/66, 102, 105, 83, 525/86, 474; 528/28

[56] References Cited

U.S. PATENT DOCUMENTS

| | | | |
|---|---|---|---|
| 3,179,622 | 4/1965 | Halvska | 528/28 |
| 3,332,900 | 7/1967 | Reischl et al. | 525/66 |
| 4,174,325 | 11/1979 | Pischtschan et al. | 525/84 |

FOREIGN PATENT DOCUMENTS

| | | | |
|---|---|---|---|
| 54-103456 | 8/1979 | Japan | 525/84 |
| 1239554 | 7/1971 | United Kingdom | 525/105 |

*Primary Examiner*—Wilbert J. Briggs, Sr.
*Attorney, Agent, or Firm*—Connolly and Hutz

[57] ABSTRACT

ABS-moulding compositions of (a) 5 to 70% by weight of one or more graft products and (b) 95 to 30% by weight of one or more thermoplastic resins with a content of 0.05 to 2.0% by weight (based on total mixture) of a silico urethane derivative to improve notched impact strength.

2 Claims, No Drawings

ABS-MOULDING COMPOSITIONS HAVING HIGH NOTCHED IMPACT STRENGTH

In addition to the actual polymerisation step, the production of ABS-moulding compositions requires a compounding step in which the graft rubber and the SAN-copolymer are intensively mixed and additives required for further processing and for practical application, such as lubricants, pigments and antistatic agents, are incorporated.

Compounding is generally carried out in internal kneaders or in twin-screw or four-screw kneaders to which a two-roll stand with a band granulator or a strand or underwater granulator is connected. The type of apparatus used depends on the process by which the ABS has been produced. Where the SAN-copolymer is in the form of a solution polymer, it is preferred to use screw kneaders. Where polymerisation is carried out in emulsion, the resulting powder is often further processed in an internal kneader.

In general, about 1 to 3% by weight of a lubricant is added to the moulding compositions as a processing aid to improve their flow behaviour and to reduce internal stresses in the mouldings produced from the compositions.

Lubricants suitable for ABS-moulding compositions are inter alia alkali and alkaline-earth salts of fatty acids, fatty acid esters of monohydric and polyhydric alcohols, and amides of long-chain fatty acids and sulphonic acids.

The present invention is based on the discovery that the addition of small quantities of "silicourethane derivatives", obtained by reacting polydialkyl siloxane, polyaryl alkyl siloxane or polydiaryl siloxane derivatives with polyisocyanates, improves impact strength, particularly the notched impact strength, above all at low temperatures.

In the context of the invention, ABS-moulding compositions are in particular mixtures of (a) 5 to 70% by weight of one or more graft products, and (b) 95 to 30% by weight of one or more thermoplastic resins.

The graft products (a) are preferably polymers obtained by polymerising graft monomers in the presence of a rubber as the graft base. The proportion of rubber is from 5 to 80% by weight and is determined by the particular polymerisation process used.

The graft bases used are, in particular, polybutadiene, butadiene/acrylonitrile and butadiene/styrene polymers and also butadiene/styrene block polymers. It is also possible to use acrylic ester/vinyl ether copolymers and EPDM terpolymers. Graft monomers are primarily styrene, mixtures of styrene and acrylonitrile, preferably in a ratio by weight of from 90:10 to 50:50, mixtures of styrene and methyl methacrylate, preferably in a ratio by weight of from 5:95 to 95:5, and mixtures of styrene, acrylonitrile and methyl methacrylate. The production of the graft products is known:

The graft monomers may be emulsion-polymerised in the presence of a latex of the graft base radical initiators being used. Where the graft base is pre-crosslinked and providing certain graft monomer/graft base ratios are maintained, the particle size of the latex of the graft base also determines the particle size of the graft polymer. The graft shell, which consists of chains of the polymer of the graft monomers chemically attached to the rubber particles, is relatively thin and does not significantly alter the diameter of the rubber particle. In the context of the invention, "diameter" or "particle size" is understood to be the mean diameter $d_{50}$, i.e. the diameter above which and below which, respectively, the diameters of 50% by wt. of the particles lie. The graft reaction is incomplete. In addition to the actual graft polymer, the ungrafted copolymer of the graft monomers is also formed. For this reason, the product of the graft reaction is referred to as the "graft product".

Graft products may also be produced by bulk-solution or bulk-suspension polymerisation where a monomer-soluble rubber is used as the starting material. In this case, the size of the graft rubber particle is determined by the phase inversion and may be varied both mechanically by stirring and also by chemically influencing the phase equilibrium (addition of dispersants). In general, particles of at least $1\mu$ in size are obtained in this way. The graft product contains a maximum of about 25% by weight of rubber.

According to the invention, it is possible to use graft products of which the particles have a diameter of from 0.05 to $20\mu$, a considerable proportion of the graft monomers being included within the rubber particle in the form of homopolymer or copolymer. Particle diameters of from 0.05 to $1.2\mu$ and from 0.05 to $0.6\mu$ are preferred. It is also possible to use several different graft products together, for example two graft products which differ from one another in their degree of grafting or their graft density, in the size of the rubber particle and/or in the graft density. A particularly suitable graft product is, for example, a mixture of a graft product of rubber particles having a $d_{50}$-value of from 0.35 to $10\mu$ and a graft product of rubber particles having a mean particle diameter $d_{50}$ of from 0.05 to $0.32\mu$, i.e. so-called bimodal systems.

The graft products preferably contain from 35 to 80% by weight (more particularly from 40 to 70% by weight) of rubber, have a mean particle diameter of from 0.1 to $0.5\mu$ and are used in such a quantity that the moulding composition contains from 5 to 25% by weight and preferably from 5 to 20% by weight of rubber (graft base).

The thermoplastic resin forming the second constituent (b) of the ABS-moulding compositions forms the continuous phase (matrix) and, generally, is a polymer or copolymer of styrene, α-methyl styrene, acrylonitrile, methyl methacrylate and maleic acid anhydride. It is preferred to use polystyrene, styrene-acrylonitrile copolymers having an acrylonitrile content of from 20 to 35% by weight, and α-methyl styrene/acrylonitrile copolymers having an acrylonitrile content of from 20 to 31% by weight. These resins have a molecular weight (weight average) of from 50,000 to 550,000. The molecular inconsistency factor, expressed by the value $(M_w/M_n) - 1 = U_n$, amounts to between 1.0 and 3.5.

If only one graft product is used for producing the moulding compositions, it is advantageous for the quantitative compositions of the graft monomers and the monomers forming the resin to correspond largely to one another. Where two graft products are used, it is advantageous for the quantitative ratio of the styrene and acrylonitrile fractions of the polymer of the graft shell of the coarser graft component to differ from that of the resin. α-Methyl styrene cannot be used as graft monomer.

The styrene or α-methyl styrene/acrylonitrile copolymers may be produced by known methods, for example by bulk polymerisation, solution polymerisation, suspension polymerisation and emulsion polymerisation.

The graft product and the thermoplastic resin are frequently produced separately from one another, generally by emulsion polymerisation. If both the graft product and the thermoplastic resin accumulate in the form of a latex, the latices may be mixed and precipitated together.

"Silico-urethane derivatives" suitable for use in accordance with the invention are any reaction products of "organofunctional" silicones with polyisocyanates and, optionally, other relatively high molecular weight polyhydroxyl compounds reactive to NCO-groups, together with chain extenders, such as diols, diamines, amino alcohols and dihydrazide compounds.

"Organofunctional" silicone derivatives are understood to be any silicone derivatives containing H-active groups which are reactive to isocyanate groups, for example: HO—, $H_2N$—,

HS—, HOOC—, $H_2N$—HN—OC—, $H_2N$—HN—CO—O— and $H_2N$—HN—CO—HN-terminal groups. Terminal HO—, $H_2N$—,

and HN-cycloalkyl groups are preferred.

Substantially difunctional organofunctional derivatives, of the type described in U.S. Pat. Nos. 3,243,475 (columns 3/4), 3,567,499 (columns 3/4) and 3,246,048 (columns 2 et seq) are preferred for synthesising polymeric silico-urethane derivatives.

Other suitable organofunctional silicone derivatives are also described for example in U.S. Pat. No. 4,057,595.

It is preferred to use silicones corresponding to the formula:

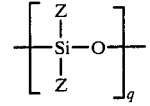

in which Z=methyl (polydimethyl siloxanes), which may even be partly replaced by other alkyl radicals (e.g. amyl radicals), or aryl (preferably phenyl); $q=3$ to 100 and preferably 5 to 50.

It is preferred to use organofunctional silicone derivatives which contain an —Si—C-bond (for example an —Si—$CH_2$—OH-group), of the type described in U.S. Pat. No. 3,243,475, column 2, lines 10 to 55, because they contain hydrolytically more stable bonds than the —SI—O—C-groups, although silicones in which the organofunctional group is attached via an —Si—O—C-bond are also suitable. The silicone derivatives may also be "block polymers" of the type described in U.S. Pat. No. 3,600,418.

The following are mentioned as examples of difunctional silicone derivatives:

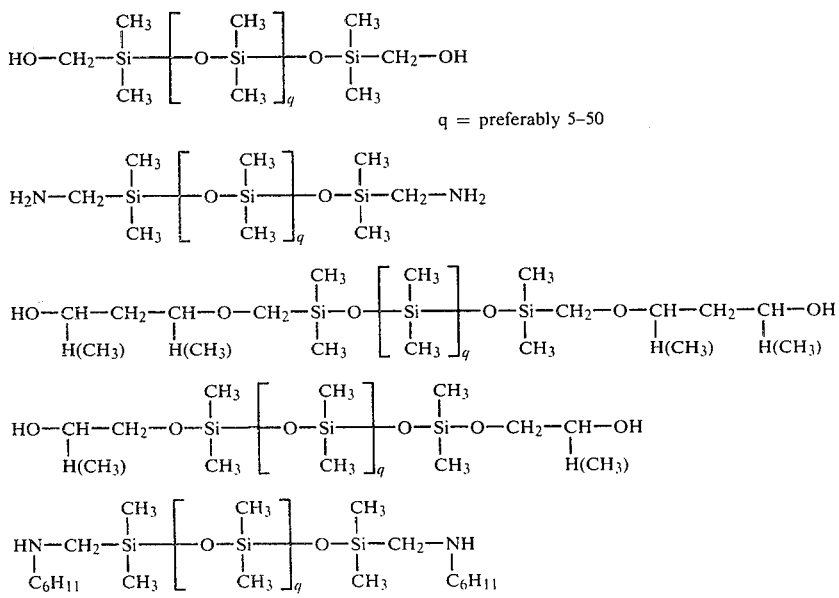

-continued

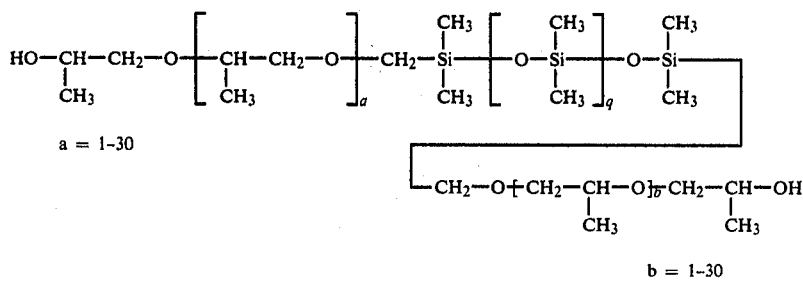

a = 1–30 b = 1–30

Further examples are mentioned in U.S. Pat. No. 4,057,595, column 3, lines 7 to 34, and column 4, lines 23 to 35. The limitation mentioned to column 4, lines 36 et seq in regard to the monomer content does not have to be observed here.

However, for using the silico-urethane derivatives in accordance with the invention, it has surprisingly been found that organofunctional silicones having a functionality of distinctly less than 2 also enable extremely effective silico-urethane derivatives to be synthesised. In this respect, the organofunctional silicones may be mixtures of monofunctional and difunctional organosilicones (in some cases even with fractions of trifunctional and higher oganosilicones), in which the following monofunctional silicones for example may be used:

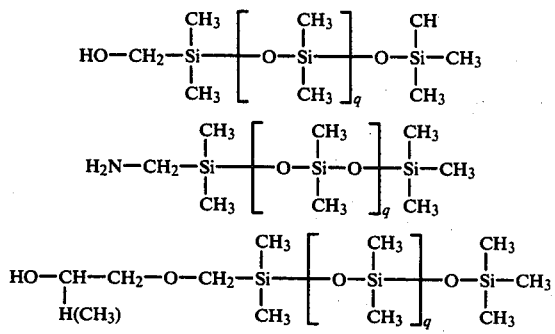

Examples of higher silicones are given in the above-mentioned U.S. Patents.

The organofunctional silicones may also be reacted in admixture with monofunctional, difunctional or higher alcohols, amines or hydrazide compounds. These may be low molecular weight compounds, such as 1-hydroxy butane, 1,4-butane diol, 1,6-cyclohexane diol, trimethylol propane, di-n-butyl amine, N,N-dimethyl hydrazine, isophorone diamine, 4,4'-diaminodicyclohexyl methane, 1,5,11-triaminoundecane or even relatively high molecular weight compounds, such as the known relatively high molecular weight linear dihydroxy polyesters, polyethers, polycaprolactone esters, and polyacetals (cf. German Pat. No. 1,157,386 and German Offenlegungsschrift No. 1,770,591). Trifunctional compounds, for example glycerol- or trimethylol propane-started trifunctional polycaprolactone esters, may also be used providing the mixture as a whole has a functionality of less than or approaching 2. In general, monofunctional components act as terminators in the synthesis reaction, whilst trifunctional and higher compounds have a strong branching effect and can only be used in limited quantities in the synthesis of soluble silico-urethanes.

The polyisocyanates used in the synthesis of the "silico-urethanes" may in principle be any organic polyisocyanates, preferably diisocyanates (cf. inter alia German Pat. No. 1,157,386 and German Offenlegungsschrift No. 1,770,591), for example aliphatic or cycloaliphatic, aromatic or heterocyclic diisocyanates. 1,6-Hexane diisocyanate, 4,4'-dicyclohexyl methane diisocyanates, 1-isocyanato-3-isocyanatomethyl-3,5,5-trimethyl cyclohexane (isophorone diisocyanate), the tolylene diisocyanates and 4,4'-diphenyl methane diisocyanate are particularly appropriate.

The silico-urethanes may be obtained by reacting the organofunctional silicones, optionally in admixture with functional silicone-free compounds (for example butane diol or dihydroxy polyesters having molecular weights in the range of from 1000 to 2000 or the like) with the polyisocyanates.

If, for example, OH-functional silicones are reacted with diisocyanates, for example isophorone diisocyanate, in equivalent quantities, "silico-urethanes" of simple structure are obtained generally in the form of oils or low-melting materials.

Where relatively high molecular weight dihydroxy polyesters or polyethers are used, weakly elastic, modified silico (polyester/polyether)-urethanes are obtained in the form of plastic materials having low softening ranges.

Where the organofunctional silicones are reacted with a molar excess of polyisocyanate, prepolymers containing terminal isocyanate groups are initially obtained and are subsequently reacted with difunctional chain extenders (optionally in admixture with monofunctional or trifunctional modifiers), for example 1,4-butane diol, bis-hydroxyethyl terephthalic acid ester, aminoethanol, ethylene diamine, propylene diamine, isophorone diamine, hydrazine or dihydrazide compounds, such as carbodihydrazide or 4-semicarbazido propionic acid hydrazide, to form a segmented silico-urethane (urea) elastomer.

If, in addition to the organofunctional silicones, relatively high molecular weight dihydroxy compounds, such as polyester diols or polyether diols, are used for prepolymer formation, elastomeric products soluble in dimethyl formamide are obtained and also produce a considerable increase in the notched impact strength of the ABS-polymers.

"Segmented" silico (polyester or polyether)-urethanes (ureas) such as these are particularly preferred silico-urethane derivatives.

The silico-urethanes (or silico-ureas which are also intended to count as silico-urethanes because they are synthesised under the rules of the diisocyanate polyaddition process) may also be obtained by "chain-extending" NCO-prepolymers of, for example, dihydroxy polyesters or polyethers and excess diisocyanates with H₂N-functional silicones.

The production of "silico-urethane" derivatives as described above is only intended as an example, numerous modifications being possible within the scope of the diisocyanate polyaddition process.

In most cases, the silico-urethane derivatives are no longer soluble in normal silicones.

The silico-urethane derivatives used in accordance with the invention should contain silicone structures (the residue of the organofunctional silicones without the terminal groups) in a proportion of at least 10% by weight, preferably in a proportion of more than 30% by weight and, with particular preference, in a proportion of more than 50% by weight.

Accordingly, the present invention relates to the use of silico-urethane derivatives containing at least 10% by weight and preferably at least 30% by weight of polydialkyl siloxanes, polydiphenyl siloxanes or polyalkylaryl siloxanes in the silico-urethane in quantities of from 0.05 to 2% by weight, based on the moulding composition, as additives for improving the notched impact strength of ABS-moulding compositions.

More particularly, the invention relates to the use of silico-urethanes consisting of reaction products of organofunctional polysiloxanes, polyisocyanates and functional silicon-free compounds in quantities of from 0.05 to 2% by weight as additives for improving the notched impact strength of ABS-moulding compositions.

The silico-urethanes may be used either on their own or together with from 0.25 to 5% by weight, based on on the moulding composition, of the usual lubricants. It is preferred to use a combination of 0.1–1.0 part by weight of silico-urethane, and
0.25–3.0 parts by weight of pentaerythritol tetrastearate, or a combination of 0.1–1.0 part by weight of silico-urethane,
0.25–2.0 parts by weight of pentaerythritol tetrastearate, and
0.5–1.5 parts by weight of the bis-stearylamide of ethylene diamine.

Particularly preferred ABS-moulding compositions consist of

5–50 parts by weight of a graft product of
  40–80 parts by weight of polybutadiene and
  60–20 parts by weight of a styrene-acrylonitrile copolymer produced in its presence with a particle diameter $d_{50}$ of from 0.1 to 0.6μ, and preferably from 0.25 to 0.5μ, and
95–50 parts by weight of a copolymer of
  75–70% by weight of styrene and 25–30% by weight of acrylonitrile or of
  70% by weight of α-methyl styrene and 30% by weight of acrylonitrile,
the moulding composition containing no more than 20% by weight of polybutadiene.

Other preferred ABS-moulding compositions consist of

6–30 parts by weight of a graft product of
  20–60 parts by weight of a mixture of styrene and acrylonitrile in a ratio by weight of from 88:12 to 60:40 on 80 to 40 parts by weight of a butadiene homopolymer or copolymer containing at least 70% by weight of butadiene and having an average particle diameter $d_{50}$ of from 0.26 to 0.65μ;
14–45 parts by weight of a graft product of
  60–40 parts by weight of a mixture of styrene and acrylonitrile in a ratio by weight of from 80:20 to 60:40 on 40 to 60 parts by weight of a butadiene homopolymer or copolymer containing at least 70% by weight of butadiene and having an average particle diameter $d_{50}$ of from 0.08 to 0.25μ; and
25–80 parts by weight of a copolymer of styrene and/or α-methyl styrene on the one hand and acrylonitrile on the other hand in a ratio by weight of from 80:20 to 60:40 with an average molecular weight of from 50,000 to 200,000.

The siloxane urethanes are preferably added to the ABS-moulding composition during compounding. If the ABS is produced by bulk-suspension polymerisation, the siloxane urethane may even be added during polymerisation.

In the quantities indicated above, silico-urethanes increase the notched impact strength without adversely affecting other physical properties. Silico-urethanes have a better effect than pure siloxanes, particularly at very low temperatures. Silico-urethanes combined with suitable lubricants give ABS-moulding compositions having optimal product properties.

EXAMPLES

A. Production and characteristics of the ABS-moulding compositions

Two methods were used for producing the ABS-moulding compositions:

1. The graft rubber latex produced by emulsion polymerisation is mixed in a certain quantitative ratio with one or more SAN-copolymer lactices produced by emulsion polymerisation. After the addition of an aqueous stabiliser dispersion (containing 0.25 to 1.5 parts by weight of a phenolic anti-oxidant per 100 parts by weight of polymer), the latex mixture is coagulated by the addition of an electrolyte or acid. The resulting powder is dried at 70° to 80° C. in a vacuum drying cabinet.

2. The graft rubber latex produced by emulsion polymerisation (or even a mixture of several graft rubber latices) is coagulated after the addition of the stabiliser and worked up into a powder. If necessary, SAN copolymer may be incorporated in the same way as described in B.

The ABS-graft rubbers and SAN-copolymers used are characterised on Tables 1 and 2.

TABLE 1

| | | Graft rubbers | | | | |
| | | Ratio by weight of styrene to acrylonitrile | Mean particle | | Composition of the graft base[3] | |
| Graft polymer | Ratio by weight of graft base to graft monomer | in the monomer mixture | diameter[1] $d_{50}$ (μ) | G value[2] | B % by weight | S % by weight |
|---|---|---|---|---|---|---|
| P 1 | 50:50 | 70:30 | 0.4 | 0.55 | 100 | — |
| P 2 | 60:40 | 88:12 | 0.4 | 0.45 | 100 | — |

TABLE 1-continued

| | | Graft rubbers | | | | |
|---|---|---|---|---|---|---|
| | | Ratio by weight of styrene to acrylonitrile in the monomer mixture | Mean particle diameter[1] $d_{50}$ (μ) | G value[2] | Composition of the graft base[3] | |
| Graft polymer | Ratio by weight of graft base to graft monomer | | | | B % by weight | S % by weight |
| P 3 | 50:50 | 70:30 | 0.1 | 0.72 | 100 | — |

[1]Ultracentrifuge measurements, cf. W. Scholtan, H. Lange, Kolloidz. and Z. Polymere 250 (1972) 783–796 and G. Kampf, H. Schuster, Angew. Makromol. Chemie 14 (1970) 111–129.

[2]The degree of grafting G (G-value) designates the ratio
$$\frac{\text{grafted styrene/acrylonitrile}}{\text{graft base}}$$

[3]B = butadiene, S = styrene

TABLE 2:

| | Styrene/acrylonitrile and α-methyl styrene/acrylonitrile copolymers | | | | |
|---|---|---|---|---|---|
| | Composition of copolymer (% by weight) | | | Viscosity[1] $\frac{\eta \text{ spec.}}{C}$ | Molecular inconsistency[2] $U_n$ |
| Copolymer | Styrene | Acrylonitrile | α-methyl styrene | | |
| S 1 | 74:26 | | | 95 | 3.0 |
| S 2 | 70:30 | | | 110 | 2.5 |

[1]Viscosity = $\frac{\eta \text{ spec.}}{C}$ with C = 5 g/l in methylethyl ketone at 25° C.

[2]$U_n = \frac{M_w}{M_n} - 1$ $M_w$ = weight average molecular weight
$M_n$ = number average molecular weight.

B. Compounding

Any known compounding unit may be used for mixing the graft product and the thermoplastic resin and also for incorporating the silico-urethane providing it ensures homogeneous mixing at 140° to 260° C. Suitable compounding units are inter alia heatable mixing rolls followed by a granulator, twin-screw and four-screw kneaders followed by a granulator, and also internal mixers and Banbuty mixers, followed by a two-roll stand and a granulator.

The compounding unit used for the purposes of the invention was a Banbury mixer of the BR (Pomini-Farrel) type operated under the following conditions:
melt temperature: 190°–225° C.
mixing time: 1.5–2 minutes
cycle time: 2.0–4 minutes.

After mixing, the material accumulates in the form of a plastic mass on a two-roll stand (roll 1 T=160° C., roll 2 T=150° C.) and is run off in the form of a band which is granulated after cooling.

C. Test procedure

Standard small test bars are produced from the granulate by injection moulding at 220° C. These standard small test bars are tested by DIN methods for notched impact strength, impact strength, hardness and thermal stability under load according to Vicat B. Processibility is determined by the flat spiral test according to H. Ebneth, K. Bohm: Fliessfahigkeit von ABS-Polymerisaten; Plastverarbeiter 19 (1968) 4, pages 261–269, at a temperature of 220° C.

D. Production of the siloxane derivatives:

EXAMPLES 1–11

(Quantities in parts by weight and % by weight)
(DMA=dimethylacetamide:DMF=dimethyl formamide)

$\eta_{inh}$-values were measured in DMA (0.5% solution) at 30° C.

For a definition of the $\eta_{inh}$-value, see M. Hoffmann, H. Kromer and R. Kuhn "Polymeranalytik" I, George-Thieme-Verlag, Stuttgart, 1977.

EXAMPLE 1

2300 Parts of an organofunctional silicone derivative containing terminal —CH$_2$OH-groups (and 2.19% by weight of OH as functional groups) are heated with 328.88 parts of 1-isocyanato-3-isocyanatomethyl-3,5,5-trimethyl cyclohexane (isophorone diisocyanate) at a temperature of 100° C. until the NCO-content has fallen to zero (4 hours). The colourless oil formed has a viscosity of 2.57 Pa.s and a relatively low molecular weight ($\eta_{inh}$=0.06). Refractive index $n_D^{20}$=1.4303.

EXAMPLE 2

500 Parts of an organofunctional polydimethyl siloxane derivative containing terminal CH$_2$OH-groups (and 2.0% OH) are mixed with 49.4 parts of hexane-1,6-diisocyanate, followed by heating at 100° C. until all the isocyanate groups have reacted (4 hours). The silicourethane has a viscosity of 1.37 Pa.s at 20° C. and relatively low molecular weight. Refractive index $n_D^{20}$: 1.4252.

EXAMPLE 3

500 Parts of an organofunctional polydimethyl siloxane derivative containing terminal —CH$_2$OH-groups (2.0% OH) are mixed with 73.53 parts of diphenylmethane-4,4'-diisocyanate at 40° C. and the cloudy mixture is heated to 60°–90° C. After 20 minutes at 90° C., all the isocyanate groups have reacted, producing an increase in viscosity. The oil has a viscosity of 9.24 Pa.s and a refractive index $n_D^{20}$ of 1.4420.

EXAMPLE 4

500 Parts of an organofunctional polydimethyl siloxane containing terminal —CH$_2$—OH-groups (2.0% OH) are mixed with 51.18 parts of tolylene-2,4-diisocyanate and the resulting mixture is heated to 90° C. over a period of 30 minutes. The cloudy mixture changes into a clear oil with an increase in viscosity. After heating for 30 minutes at 90° C., no more isocyanate groups are present. The oil has a viscosity of 2.78 poises and a refractive index $n_D^{20}$ of 1.4353.

EXAMPLE 5

1100 Parts of an organofunctional polydimethyl siloxane containing terminal Si—CH$_2$OH—groups (2.0% OH) are mixed at 50° C. with a melt of 1100 parts of an adipic acid-1,6-hexane diol-2,2-dimethyl-1,3-propane diol copolyester (molar ratio of the glycols 65:35) having a terminal OH-group content of 1.592%, followed by the addition of a solution of 458.85 parts of diphenyl methane-4,4'-diisocyanate in 664.7 parts of dimethyl formamide. After a reaction time of 120 minutes at 50° C., an NCO-prepolymer solution having a solids content of 80% and an NCO-content of 2.23% (based on solids) is obtained.

300 Parts of this NCO-prepolymer solution are introduced into a freshly prepared suspension of ethylene diamine carbonate (38.12 parts of ethylene diamine in 4349 parts of dimethyl formamide to which 50 parts of solid carbonic acid have been added). A solution is formed with an increase in viscosity to 0.6 Pa.s/20° C. The elastomeric silico-urethane (urea) has a relatively low molecular weight and a $\eta_{inh}$-value of 0.39.

If the DMF-solution is cast to form a film (drying at 100° C.), an elastic film which softens considerably between 135° and 160° C. is obtained. The silico-urethane elastomer is precipitated, for example from DMF-solution, by pouring into excess methanol and washed free from DMF with fresh methanol.

EXAMPLE 6

100 Parts of an organofunctional dimethyl polysiloxane containing terminal —CH$_2$OH-groups (2.0% OH), 100 parts of the copolyester described in Example 5, (1.592% OH) and 10.75 parts of a trifunctional polyester of trimethylol propane and caprolactone, molecular weight 1016 (5.0% OH), are mixed with a solution of 45.6 parts of diphenyl methane-4,4'-diisocyanate in 64 parts of dimethyl formamide, followed by reaction for 40 minutes at 50° C. to form an NCO-prepolymer solution having an NCO-content of 1.806% (based on solids).

1.11 Parts of ethylene diamine are dissolved in 170 parts of dimethyl formamide, followed by the addition of 3 parts of solid carbon dioxide. 107.5 Parts of the NCO-prepolymer are then added with stirring, resulting in the formation of a moderately viscous colourless elastomer solution having a solution viscosity of 1.93 Pa.s and an inherent viscosity $\eta_{inh}$ of 0.515. The elastomer solution is stirred into excess methanol and the elastomer is isolated therefrom.

EXAMPLE 7

107.5 Parts of the NCO-prepolymer solution described in Example 5 are introduced into a solution of 0.925 part of hydrazine hydrate in 170 parts of dimethyl formamide, resulting in the formation of a slightly cloudy, viscous (2.1 Pa.s) elastomer solution. The elastomeric silicourethane (urea) is isolated by precipitation in methanol.

EXAMPLE 8

107.5 Parts of the NCO-prepolymer solution described in Example 5 are stirred into a solution of 3.11 parts of H$_2$N.NH.CO.NH.CH$_2$.CH$_2$.CO.NH.NH$_2$ in 7 parts of water and 164 parts of dimethyl acetamide. The viscous solution (3.1 Pa.s) is precipitated in methanol and dried to form the elastomeric silico-urethane (urea) solid.

EXAMPLE 9

300 Parts of an organofunctional polydimethyl siloxane containing terminal —Si—CH$_2$OH-groups (2.915% OH), 549.2 parts of the copolyester described in Example 5 (1.592% OH) and 128.6 parts of diphenyl methane-4,4'-diisocyanate are heated in 680 parts of dimethyl formamide at 50° C. until the NCO-content has fallen to zero (2 hours). The elastomer substance is precipitated by pouring into methanol and isolated in the form of a paste. The $\eta_{inh}$-value amounts to 0.31.

EXAMPLE 10

1000 Parts of polytetramethylene glycol having a molecular weight of 2000 (Polymeg 2000, a product of the Quaker Oats Company), 4.47 parts of trimethylol propane, and 400 parts of an organofunctional polydimethyl siloxane containing terminal —Si—CH$_2$OH-groups (1.592% OH) are reacted at 40°–45° C. with a solution of 368.5 parts of diphenyl methane 4,4'-diisocyanate in 443 parts of dimethyl formamide until formation of the NCO-prepolymer is complete (1 hour). The prepolymer has an NCO-content of 3.49% (based on solids).

1875 Parts of the NCO-prepolymer solution are introduced into a solution of 101.2 parts of 1-amino-3-aminomethyl-3,5,5-trimethyl cyclohexane (isophorone diamine) and 8.1 parts of di-n-butylamine in 2845 parts of dimethyl formamide. The elastomer solution formed is converted into the solid (a plastic elastomeric material) by precipitation in water/methanol.

EXAMPLE 11

1000 Parts of a linear polypropylene ether diol (molecular weight 1000) are reacted at 50° to 70° C. with 500 parts of diphenyl methane-4,4'-diisocyanate to form the NCO-prepolymer, the reaction being continued until the NCO-content has fallen to 5.9 % (approximately 2 hours).

1000 Parts of the NCO-melt are added with vigorous stirring to a suspension of the following organofunctional polydimethyl siloxane:

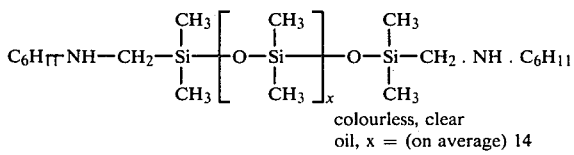

colourless, clear oil, x = (on average) 14 which contains terminal —SI—CH$_2$NH—C$_6$H$_5$-groups and has an average molecular weight of about 1392, in dimethyl formamide (1000 parts of silicone diamine in 2950 parts of DMF). The elastomer solution formed is precipitated in methanol and dried to form the solid.

EXAMPLES 11–20, Comparison Example a

A moulding composition of the following constitution is prepared by latex mixing and coagulation:

| | |
|---|---|
| graft polymer P 2 | 155 parts by weight |
| graft polymer P 3 | 245 parts by weight |

-continued

| | |
|---|---|
| resin polymer S 1 | 600 parts by weight. |

The powder is compounded in the BR Banbury mixer in accordance with B, the following additions being made per 100 parts by weight of powder:

| Example | Siloxane compound (parts by weight) |
|---|---|
| a | — (Comparison) |
| 11–20 | 0.5 of the compounds of Examples 1–10 |

Testing in accordance with C produced the results set out in Table 3:

TABLE 3

| | Example No. | | | | | | | | | | |
|---|---|---|---|---|---|---|---|---|---|---|---|
| | a | 11 | 12 | 13 | 14 | 15 | 16 | 17 | 18 | 19 | 20 |
| Notched impact strength 23° C. kJ/m² | 5.3 | 15.2 | 15.7 | 15.9 | 16.0 | 15.7 | 16.1 | 15.9 | 16.0 | 15.3 | 16.0 |
| Indentation hardness 30 s | 88.1 | 88.0 | 88.3 | 88.0 | 88.2 | 88.0 | 88.6 | 88.2 | 88.0 | 88.5 | 88.4 |
| Flow on flat spirals, cm at 220° C. | 37.0 | 37.5 | 37.0 | 37.5 | 37.5 | 37.5 | 37.0 | 37.5 | 37.0 | 37.0 | 37.5 |
| Siloxane compound according to Example No. (0.5% by weight) | — | 1 | 2 | 3 | 4 | 5 | 6 | 7 | 8 | 9 | 10 |

EXAMPLES 21–24, Comparison Example b

An ABS-moulding composition of the following constitution is prepared by latex mixing and coagulation:

| | |
|---|---|
| graft polymer P 1 | 25 parts by weight |
| resin polymer S 2 | 75 parts by weight. |

The following additions (parts by weight, based on 100 parts by weight of ABS-powder) are made in an internal kneader in accordance with B:

| Example No. | Siloxane compound (parts by weight) | Ca-stearate (parts by weight) |
|---|---|---|
| b | — | — |
| 21 | 0.5 product of Example 2 | 0.5 |
| 22 | 0.5 product of Example 5β | 0.5 |
| 23 | 0.5 product of Example 7 | 0.5 |
| 24 | 0.5 product of Example 10 | 0.5 |

Testing in accordance with C produced the results set out in Table 4:

TABLE 4

| | Example No. | | | | |
|---|---|---|---|---|---|
| | b | 21 | 22 | 23 | 24 |
| Notched impact strength 23° C., kJ/m² | 7.2 | 18.9 | 19.0 | 19.0 | 18.9 |
| Ball indentation hardness 30 s | 93 | 95 | 94 | 95 | 94 |

EXAMPLES 25–29

A moulding composition of the following constitution is prepared by latex mixing and coagulation:

| | |
|---|---|
| graft polymer P 1 | 40 parts by weight |
| resin polymer S 1 | 60 parts by weight. |

The following additions (parts by weight based on 100 parts by weight of ABS-powder) are made in an internal kneader in accordance with B:

| Example No. | Siloxane Compound | Parts by weight |
|---|---|---|
| 25 | polydimethyl siloxane (Comparison) viscosity at 20° C. = 100 cSt. | 0.2 |
| 26 | product of Example 1 | 0.5 |
| 27 | product of Example 6 | 0.5 |
| 28 | product of Example 8 | 0.5 |
| 29 | product of Example 9 | 0.5 |

Testing in accordance with C produced the results set out in Table 5:

TABLE 5

| | Example No. | | | | |
|---|---|---|---|---|---|
| | 25 | 26 | 27 | 28 | 29 |
| Notched impact strength 40° C., kJ/cm² | 3.6 | 5.9 | 6.2 | 6.4 | 6.2 |

We claim:
1. A molding composition comprising
   (a) 5 to 70% by weight of at least one graft product made by graft polymerizing styrene, a mixture of styrene and acrylonitrile, a mixture of styrene and methylmethacrylate, or a mixture of styrene, acrylonitrile and methylmethacrylate onto a polybutadiene, a butadiene/styrene, or a butadiene/acrylonitrile rubber,
   (b) 95 to 30% by weight of a thermoplastic resin selected from the group consisting of polystyrene, polymerized styrene and methylmethacrylate and polymerized styrene, acrylonitrile and methylmethacrylate, and 0.05–2% by weight based on the total mixture of a silico urethane derivative which is the reaction product of an organofunctional silicone with a polyisocyanate.
2. A moulding composition according to claim 1, wherein the silico urethane derivative is made from an organo functional polydimethyl siloxane which has the recurring structural unit of the formula
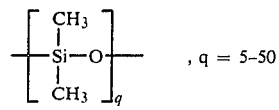
which contains as functional terminal groups primary and/or secondary OH-groups and/or primary and/or secondary amino groups.